United States Patent Office 2,798,063
Patented July 2, 1957

2,798,063

INTERPOLYMERS OF VINYLPYRIDINES OR VINYLQUINOLINES, ACRYLIC ESTERS AND ACRYLONITRILE, AND HYDROSOLS THEREOF

William F. Fowler, Jr., and Richard J. Hellmann, Rochester, N. Y., assignors to Eastman Kodak Company, Rochester, N. Y., a corporation of New Jersey No Drawing. Application February 5, 1954,
Serial No. 408,571

15 Claims. (Cl. 260—80.5)

This invention relates to ternary interpolymers containing vinylpyridine or vinylquinoline which have the ability to mordant acid dyes, to hydrosols thereof which are compatible with certain hydrophilic colloids to give improved compositions where such colloids are employed.

In the preparation of various photographic materials the usual practice has been to employ a naturally occurring hydrophilic colloid such as gelatin. One of the principal objects to the use of gelatin and other like colloids is their tendency to brittleness when coated from aqueous solution in the form of a layer of substantial thickness. Various attempts to improve the flexibility of gelatin and like colloids by adding thereto suspensions of elastic material, prior to coating, have usually been found to be unsatisfactory because of the optical and mechanical incompatibility of the gelatin with the additive resulting in too much haziness of the final film or coagulation of the suspension before the gelatin layer has dried. For instance, addition of synthetic water-soluble polymers to gelatin or the like has been generally unsatisfactory as usually these polymers are either incompatible with the gelatin at some point or exhibit brittleness. Also, gelatin and like colloids are incapable of mordanting or fixing acid dyes. Consequently, in certain processes where such dyes are employed, especially in photographic processes, it is necessary to employ a mordanting agent in one or more layers or coatings to prevent diffusion of the dyes.

We have now found that superior mordants for acid dyes, which are at the same time highly compatible with aqueous gelatin solutions and impart thereto improved flexibility without loss of any of the good properties of gelatin are obtained by interpolymerizing minor proportions of certain vinylpyridines or vinylquinolines with major proportions of mixtures of an alkyl acrylate or alpha substituted acrylate such as methacrylate and acrylonitrile. The interpolymers of our invention are especially good mordants for photographic purposes. They can be employed advantageously to prevent diffusion of dyes and dye couplers, etc. containing carboxyl, sulfonic acid or sulfonic acid ester groups, and the like, when incorporated in light filter layers, in backing layers designed to prevent back reflection from the film support, in overcoating layers to protect the film, in imbibition printing blanks. They are also useful as carriers for the silver halide or with other polymers such as gelatin, casein, and its derivatives and cellulose derivatives to act as peptizers and permit grain growth. In general, the interpolymers of our invention are of value for both color and black-and-white photographic applications.

It is, accordingly, an object of the invention to provide a new class of synthetic resins containing vinylpyridine or vinylquinoline type compounds. Another object is to provide synthetic resins which mordant acid dyes. A further object is to provide hydrosols of our new class of resins which are compatible with aqueous gelatin solutions, which solutions can be coated out and dried to give layers of improved flexibility and dye mordanting without loss of optical properties, as compared with gelatin alone. A still further object is to provide a process for preparing our new class of resinous interpolymers and hydrosols thereof. Other objects will become apparent hereinafter.

In accordance with the invention, we prepare our new vinylpyridine or vinylquinoline polymers by heating in the presence of a polymerization catalyst a mixture comprising as the sole polymerizable components from 3.5 to 16 parts by weight (equivalent to approximately from 4.7 to 21.5 parts by weight of the hydrochloride salt) of a vinylpyridine or vinylquinoline compound, from 25 to 70 parts by weight of the alkyl acrylate or alpha substituted alkyl acrylate compound and from 25 to 70 parts by weight of acrylonitrile. The final polymeric products obtained contain the polymerizable components in about the same proportions as present in the initial polymerization mixtures.

Suitable vinylpyridine and vinylquinoline compounds for practicing our invention are the C-vinyl group substituted pyridines and quinolines represented by the following general formulas:

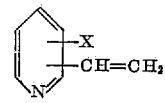

and

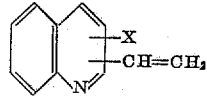

wherein X represents an atom of hydrogen, an alkyl group containing from 1 to 4 carbon atoms or a halogen group such as chlorine or bromine. Typical compounds of this group are 2-vinylpyridine, 3-vinylpyridine, 4-vinylpyridine, 2-vinylquinoline, 3-methyl-5-vinylpyridine, 3-vinylquinoline, 3-methyl-2-vinylquinoline, 5-bromo-2-vinylpyridine, 5-chloro-2-vinylpyridine, etc. Preferably these heterocyclic nitrogen bases are employed in the polymerizations in the form of a water-soluble salt, e. g. the hydrochloride salts. Suitable alkyl acrylates may be represented by the following general formula:

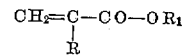

wherein R represents a hydrogen atom, a halogen atom, or an alkyl group containing from 1 to 4 carbon atoms and $R_1$ represents an alkyl group containing from 1 to 12 carbon atoms, a cyanoalkyl group containing from 1 to 4 carbon atoms and a halogen substituted alkyl group containing from 1 to 4 carbon atoms such as methyl acrylate, ethyl acrylate, isopropyl acrylate, propyl acrylate, isobutyl acrylate, sec. butyl acrylate, tert. butyl acrylate, n-butyl acrylate, n-octyl acrylate, 2-ethylhexyl acrylate, β-cyanoethyl acrylate, β-chloroethyl acrylate, methyl methacrylate, ethyl methacrylate, isobutyl methacrylate, n-butyl methacrylate, β-cyanoethyl methacrylate, β-chloroethyl methacrylate, etc.

The polymerizations for preparing the above-defined new class of resinous ternary interpolymers of the invention can be carried out in aqueous dispersion, in the presence of a polymerization catalyst. Heat and actinic light also accelerate the polymerizations. Suitable catalysts include per-compounds such as organic and inorganic peroxides, for example, benzoyl peroxide, acetyl peroxide, lauroyl peroxide, hydrogen peroxide, persulfates e. g. alkali metal persulfates such as sodium and potassium persulfates, ammonium persulfate, etc., perborates e. g. alkali metal perborates such as sodium and potassium perborates, ammonium perborate, etc. Azo-bis-nitriles are also effective polymerization catalysts. Mixtures of catalysts may be employed. The amount of catalyst can be varied over a wide range, but advantageously from about 0.01 to 2.0 percent or more, based on the total weight monomers to be polymerized. The temperature at which the polymerizations are carried out can vary from about 30° C. to 100° C., but preferably from 50° to 90° C. Batch or continuous processes can be employed. Where a continuous process is used, the monomers and other substituents making up the reaction mixture can be added to the reaction system in continuous manner and the polymer withdrawn from the system as formed.

For the preparation of the hydrosols of our invention, the polymerizations must be carried out in aqueous dispersions, in the presence preferably of a water-soluble catalyst such as potassium persulfate, and advantageously in the presence also of a surface active agent. The preferred practice is to first prepare an aqueous solution containing the catalyst, the surface active agent, and the basic monomer adjust to pH 4.0 with a strong acid, heat the solution to the desired temperature, and then add the other monomers in admixture dropwise to the reaction mixture, or add separately dropwise and at such rate that the respective monomers are completely added at the end of any stated time period. After completion of the addition of all of the monomers, the reaction mixture is then heated for a period up to several hours or more on a steam bath. The resulting stable hydrosol is found to contain the resinous interpolymers, above-defined, in the form of small particles or beads measuring in diameter about from 72 to 150 millimicrons. If desired an activating agent such as an alkali metal sulfite or bisulfite e. g. sodium, potassium, etc. sulfites and metabisulfites can be added to the polymerization reaction mixture in about the same amount as the polymerization catalyst, in which case lower polymerization temperature may be used. Chain regulators such as hexyl, cetyl, dodecyl, myristyl, etc. mercaptans can also be employed in the polymerizations. Suitable surface active agents include dimethyl (β-hydroxyethyl) (γ-stearamidopropyl) ammonium chloride, and similar cationic surfactants.

The following examples will serve further to illustrate the manner whereby we practice our invention.

EXAMPLE 1

A solution of 3.4 g. of a surface active agent Aerosol-SE 50 percent solution of dimethyl (β-hydroxylethyl) (γ-stearamidopropyl) ammonium chloride and 14.1 g. of the hydrochloride of freshly distilled 4-vinylpyridine (equivalent to 10.6 g. of the free base) in 800 cc. of distilled water was adjusted to pH=4.0 with dilute hydrochloric acid. This solution in a 3-necked, 2-liter flask, equipped with two dropping funnels, a thermometer to measure liquid temperature, and a mechanical stirrer was placed on a steam pot. The temperature of the solution was raised to 80° C. and 1.27 g. of potassium persulfate were added. To this solution was added dropwise with stirring, over a 40-minute period, a mixture of 178 g. of n-butyl acrylate and 76 g. of acrylonitrile. During this same period, a solution of 3.44 g. of the above surface-active agent (50 percent solution) in 200 cc. of distilled water adjusted to pH=4 with dilute hydrochloric acid was added dropwise to the reaction mixture from the other dropping funnel. The mixture was maintained at 80°–82° C. during the addition and for 15 minutes afterward. Then the reaction mixture was cooled to room temperature under the cold water tap, filtered through cloth to separate it from some coagulum to yield a translucent, clear hydrosol which contained approximately 20 percent by weight of interpolymer solids consisting in combined form of about 4 percent by weight of 4-vinylpyridine, 67 percent by weight of n-butyl acrylate and the remainder of acrylonitrile. The hydrosol was compatible in all proportions with 7 percent aqueous gelatin solutions.

EXAMPLES 2–6

In the following table is shown a series of interpolymers prepared according to the process described in Example 1, with variation in percentage of components in the polymer.

*Table*

| Example No. | Weight Percent | | |
| --- | --- | --- | --- |
| | n-Butyl Acrylate | Acrylonitrile | 4-Vinyl Pyridine |
| 2 | 28.9 | 67.1 | 4.0 |
| 3 | 42.0 | 42.0 | 16.0 |
| 4 | 48.0 | 48.0 | 4.0 |
| 5 | 58.9 | 25.1 | 16.0 |
| 6 | 64.4 | 27.6 | 8.0 |

In general, increasing the amount of the surface active agent gave hydrosols having greater clarity. Thus hydrosols prepared in the presence of 0.0019 molar strength of the surface active agent tended to be hazy, while with a molarity of 0.0172 of the surface active agent the resulting hydrosols intended to be translucent and clear. In place of the 4-vinylpyridine in the above examples, there can be substituted a like amount of 2-vinylpyridine to give interpolymers having similar percentage compositions and properties. Also the n-butyl acrylate can be replaced with ethyl acrylate.

EXAMPLE 7

Four aqueous solutions were prepared, each containing 7% total solids. One contained only gelatin, while in the other three 9, 12, and 15% respectively of the gelatin was replaced by the composition of Example 6, added as a 20% hydrosol. The pH of the solutions was adjusted to 4.5 and then 25 cc. of 10 percent formaldehyde solution were added per pound of gelatin, and the solutions were coated to a thickness equivalent to 1 pound of dry gelatin per 400 square feet.

The dried coatings were used as imbibition blanks for receiving dye from a tanned gelatin relief matrix dyed with the following solution:

|  | G. |
| --- | --- |
| Alizarin light red B | 1 |
| Sodium acetate | 5 |

Glacial acetic acid to yield pH=4.0.
Water to make 1 liter.

The samples containing the polymer gave very much better definition than the control sample, and the improvement increased with the concentration of polymeric hydrosol used in the coating solution.

By proceeding as described in the above examples, other ternary interpolymers of the invention coming within the specified proportions can be prepared with others of the mentioned suitable components. These other interpolymers have similar properties and their hydrosols likewise are compatible with aqueous gelatin solutions and in such admixtures also give clear, flexible films capable of retaining acid dyes.

What we claim is:

1. A resinous ternary interpolymer comprising from 3.5 to 16 percent by weight of a compound selected from those represented by the following general formulas:

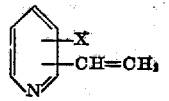

and

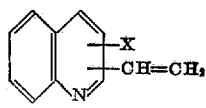

wherein X represents a member selected from the group consisting of an atom of hydrogen, an alkyl group containing from 1 to 4 carbon atoms and a halogen atom, from 25 to 70 percent by weight of a compound selected from those represented by the following general formula:

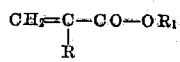

wherein R represents a member selected from the group consisting of an atom of hydrogen, a halogen atom and an alkyl group containing from 1 to 4 carbon atoms and R₁ represents a member selected from the group consisting of an alkyl group containing from 1 to 12 carbon atoms, a cyanoalkyl group containing from 1 to 4 carbon atoms, and a halogen substituted alkyl group containing from 1 to 4 carbon atoms, and from 25 to 70 percent by weight of acrylonitrile.

2. A resinous ternary interpolymer comprising from 3.5 to 16 percent by weight of 4-vinylpyridine, from 25 to 70 percent by weight of n-butyl acrylate and from 25 to 70 percent by weight of acrylonitrile.

3. A resinous ternary interpolymer comprising from 3.5 to 16 percent by weight of 4-vinylpyridine, from 25 to 70 percent by weight of ethyl acrylate and from 25 to 70 percent by weight of acrylonitrile.

4. A resinous ternary interpolymer comprising from 3.5 to 16 percent by weight of 2-vinylpyridine, from 25 to 70 percent by weight of n-butyl acrylate and from 25 to 70 percent by weight of acrylonitrile.

5. A resinous ternary interpolymer comprising from 3.5 to 16 percent by weight of 2-vinylpyridine, from 25 to 70 percent by weight of ethyl acrylate and from 25 to 70 percent by weight of acrylonitrile.

6. A gelatin compatible hydrosol of a resinous ternary interpolymer comprising from 3.5 to 16 parts by weight of a compound selected from those represented by the following general formulas:

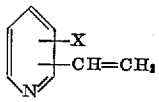

and

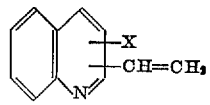

wherein X represents a member selected from the group consisting of an atom of hydrogen, an alkyl group containing from 1 to 4 carbon atoms and a halogen atom, from 25 to 70 parts by weight of a compound selected from those represented by the following general formula:

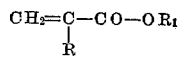

wherein R represents a member selected from the group consisting of an atom of hydrogen, a halogen atom and an alkyl group containing from 1 to 4 carbon atoms and R₁ represents a member selected from the group consisting of an alkyl group containing from 1 to 12 carbon atoms, a cyanoalkyl group containing from 1 to 4 carbon atoms and a halogen substituted alkyl group containing from 1 to 4 carbon atoms, and from 25 to 70 parts by weight of acrylonitrile.

7. A gelatin compatible hydrosol of a resinous ternary interpolymer comprising from 3.5 to 16 parts by weight of 4-vinylpyridine, from 25 to 70 parts by weight of n-butyl acrylate and from 25 to 70 parts by weight of acrylonitrile.

8. A gelatin compatible hydrosol of a resinous ternary interpolymer comprising from 3.5 to 16 parts by weight of 4-vinylpyridine, from 25 to 70 parts by weight of ethyl acrylate and from 25 to 70 parts by weight of acrylonitrile.

9. A gelatin compatible hydrosol of a resinous ternary interpolymer comprising from 3.5 to 16 parts by weight of 2-vinylpyridine, from 25 to 70 parts by weight of n-butyl acrylate and from 25 to 70 parts by weight of acrylonitrile.

10. A gelatin compatible hydrosol of a resinous ternary interpolymer comprising from 3.5 to 16 parts by weight of 2-vinylpyridine, from 25 to 70 parts by weight of ethyl acrylate, and from 25 to 70 parts by weight of acrylonitrile.

11. A process for preparing a gelatin compatible hydrosol of a resinous ternary interpolymer which comprises dispersing from 3.5 to 16 parts by weight of a compound selected from those represented by the following general formulas:

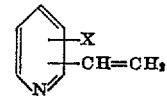

and

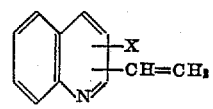

wherein X represents a member selected from the group consisting of an atom of hydrogen, an alkyl group containing from 1 to 4 carbon atoms and a halogen atom, in water containing a per-compound polymerization catalyst and a surface active agent, heating the mixture to a temperature of from 30° to 100° C., and while maintaining the said mixture at said temperature slowly introducing therein a mixture of from 25 to 70 parts by weight of a compound selected from those represented by the following general formula:

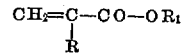

wherein R represents a member selected from the group consisting of an atom of hydrogen, a halogen atom and an alkyl group containing from 1 to 4 carbon atoms and R₁ represents a member selected from the group consisting of an alkyl group containing from 1 to 12 carbon atoms, a cyanoalkyl group containing from 1 to 4 carbon atoms and a halogen substituted alkyl group containing from 1 to 4 carbon atoms, and from 25 to 70 parts by weight of acrylonitrile, and then continuing to heat the reaction mixture at said temperature until the said monomeric compounds have interpolymerized and formed the said hydrosol.

12. A process for preparing a gelatin compatible hydrosol to a temperature of from 50° to 90° C., and while maintaining said solution at said temperature, which comprises dissolving from 4.7 to 21.5 parts by weight of 4-vinylpyridine in water containing potassium persulfate and a surface active agent, the said salt being equivalent to from 3.5 to 16 parts by weight of the free base, heating the solution and slowly adding to the heated solution a mixture of from 25 to 70 parts by weight of n-butyl acrylate and from 25 to 70 parts by weight of acrylonitrile, and then continuing to heat the reaction mixture at said temperature until the said monomeric compounds have interpolymerized to form the said hydrosol.

13. A process for preparing a gelatin compatible hydrosol to a temperature of from 50° to 90° C., and while maintaining said solution at said temperature, which comprises dissolving from 4.7 to 21.5 parts by weight of the hydrochloride salt of 4-vinylpyridine in water containing potassium persulfate, and a surface active agent, the said salt being equivalent to from 3.5 to 16 parts by weight of the free base, heating the solution and slowly adding to the heated solution a mixture of from 25 to 70 parts by weight of ethyl acrylate and from 25 to 70 parts by weight of acrylonitrile, and then continuing to heat the reaction mixture at said temperature until the said monomeric compounds have interpolymerized to form the said hydrosol.

14. A process for preparing a gelatin compatible hydrosol to a temperature of from 50° to 90° C., and while maintaining said solution at said temperature, which comprises dissolving from 4.7 to 21.5 parts by weight of the hydrochloride salt of 2-vinylpyridine in water containing potassium persulfate and a surface active agent, the said salt being equivalent to from 3.5 to 16 parts by weight of the free base, heating the solution and slowly adding to the heated solution a mixture of from 25 to 70 parts by weight of n-butyl acrylate and from 25 to 70 parts by weight of acrylonitrile, and then continuing to heat the reaction mixture at said temperature until the said monomeric compounds have interpolymerized to form the said hydrosol.

15. A process for preparing a gelatin compatible hydrosol to a temperature of from 50° to 90° C., and while maintaining said solution at said temperature, which comprises dissolving from 4.7 to 21.5 parts by weight of the hydrochloride salt of 2-vinylpyridine in water containing potassium persulfate and a surface active agent, the said salt being equivalent to from 3.5 to 16 parts by weight of the free base, heating the solution and slowly adding to the heated solution a mixture of from 25 to 70 parts by weight of ethyl acrylate and from 25 to 70 parts by weight of acrylonitrile, and then continuing to heat the reaction mixture at said temperature until the said monomeric compounds have interpolymerized to form the said hydrosol.

References Cited in the file of this patent
FOREIGN PATENTS 500,644    Belgium _____ July 16, 1951

UNITED STATES PATENT OFFICE

CERTIFICATE OF CORRECTION

Patent No. 2,798,063                                                             July 2, 1957

William F. Fowler, Jr., et al.

It is hereby certified that error appears in the printed specification of the above numbered patent requiring correction and that the said Letters Patent should read as corrected below.

Claims 12 to 15, lines 2 to 3, in each occurrence, strike out "to a temperature of from 50° to 90° C., and while maintaining said solution at said temperature," and insert the same instead in line 8, after "the solution", in each of said claims.

Signed and sealed this 24th day of December 1957.

(SEAL)
Attest:

KARL H. AXLINE
Attesting Officer

ROBERT C. WATSON
Commissioner of Patents